March 6, 1928.
D. C. DAVIS
1,661,718
HARDNESS TESTING DEVICE
Filed Feb. 2, 1927
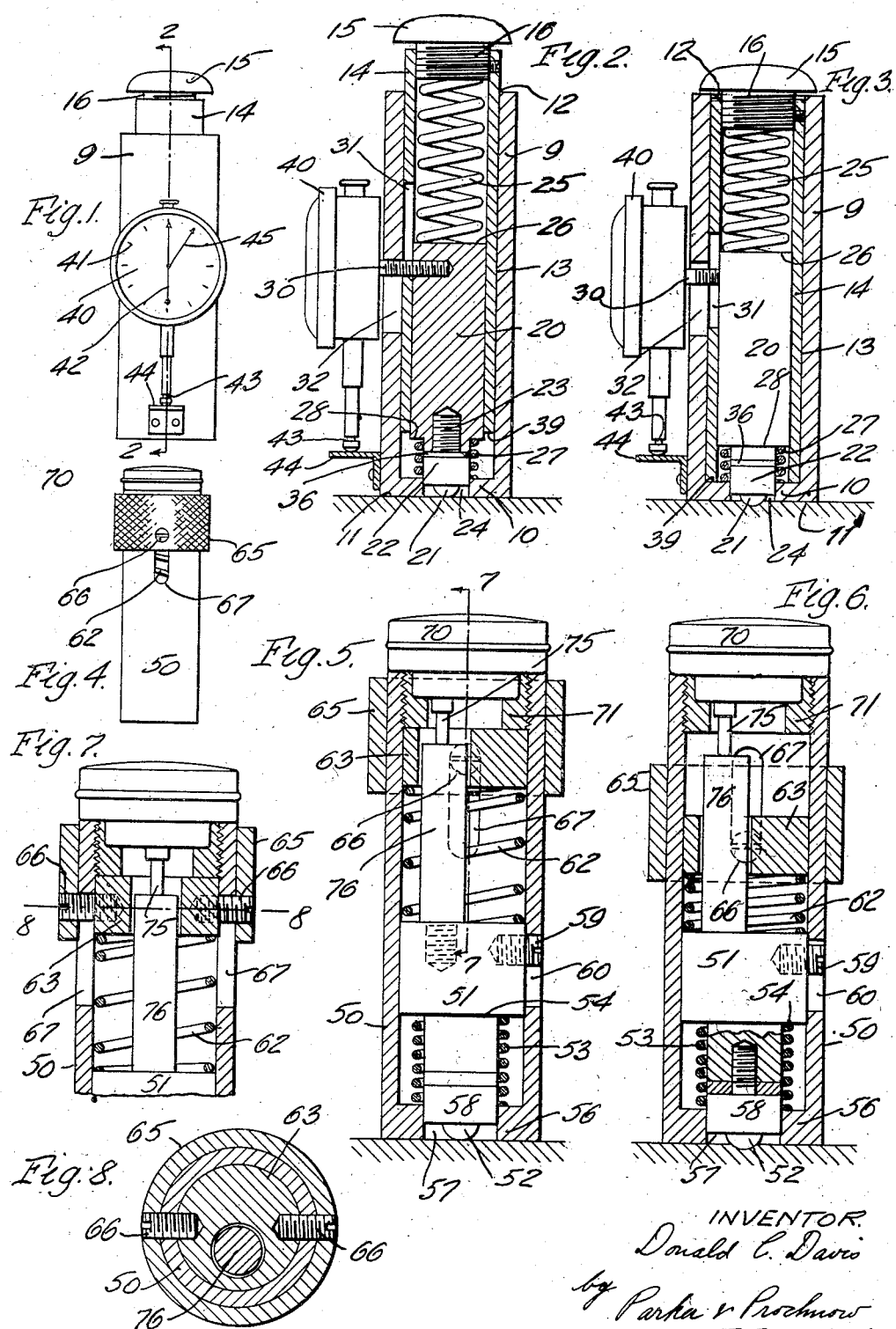
INVENTOR.
Donald C. Davis
by Parker & Prochnow
ATTORNEYS.

Patented Mar. 6, 1928.

1,661,718

UNITED STATES PATENT OFFICE.

DONALD C. DAVIS, OF WILLIAMSVILLE, NEW YORK.

HARDNESS-TESTING DEVICE.

Application filed February 2, 1927. Serial No. 165,408.

This invention relates to improvements in devices for testing the hardness of materials by the Brinell method, in which a hardened steel ball is pressed against a sample or piece of material to be tested, and the hardness of which is determined from the measurement of the indentation made by the ball in the sample under a predetermined pressure. The invention relates more particularly to portable hand tools or devices for this purpose, which are placed upon the sample and have an operating member which is moved by hand to compress a measuring element to force the test ball or member into the surface of the sample by the endwise movement of a plunger.

The principal object of the invention is to provide a compact and inexpensive portable device or hand tool of this character having relatively few, simple parts, and which will not readily get out of order; also to provide a device of this character in which the parts can be renewed or replaced at small cost.

Other objects are to provide a device of this sort having a relatively stationary, sample-engaging part or face, a plunger provided with a test ball or member, and means for normally holding the plunger in its inoperative position and with the test member in predetermined relation to said sample-engaging part or face; also to construct a device of this sort having an operating member disposed exteriorly of the casing of the device and operatively connected to a part slidable in the casing and which engages a compressible measuring element so that said operating member may be quickly moved by hand to compress said element and move the plunger and its test member for making a test; also to provide positive stop means whereby the operating member is moved a definite distance for each test regardless of the kind or hardness of material being tested.

Further objects are to construct a device of this kind in which the parts may be readily disconnected and the measuring element removed and replaced by another of different capacity, and also to improve, generally, the construction of hardness testing devices of this kind in the other respects hereinafter set forth and claimed.

In the accompanying drawings:

Fig. 1 is a side elevation of one form of portable hand-operated, hardness testing device embodying the invention.

Fig. 2 is a vertical, sectional elevation on an enlarged scale, of the device on line 2—2, Fig. 1, showing the parts in a normal, inoperative position and with the device resting on the surface of the sample to be tested.

Fig. 3 is a similar figure showing the parts in operative position, in which the test ball has been forced into the surface of the sample.

Fig. 4 is a side elevation of a hardness testing device of slightly modified construction.

Figs. 5 and 6 are vertical, sectional elevations on an enlarged scale thereof, showing the parts in inoperative and operative positions respectively.

Fig. 7 is a fragmentary, sectional elevation thereof on line 7—7, Fig. 5.

Fig. 8 is a horizontal, sectional view thereof on line 8—8, Fig. 7.

The portable hardness testing device or tool shown in Figs. 1–3 comprises a cylindrical casing 9 open at its upper end and having at its lower end a transverse bottom wall 10 formed with a flat, outer sample-engaging face 11.

Extending into the upper, open end 12 of said casing 9 is an annular, hollow, cylindrical member or sleeve 14 provided at its upper end with an operating member or knob 15 preferably detachably connected thereto by a screw-threaded shank 16. The outer surface of the member 14 slidingly engages the cylindrical, inner wall 13 of the casing 9.

A cylindrical plunger 20 extends upwardly into the lower, open end of the sleeve 14 and slidingly engages its inner wall. To the lower end of this plunger is secured the test ball or member 21, preferably by means of a ball-retaining member or holder 22 having a screw-threaded shank 23 engaging in a threaded hole in the plunger 20. The holder 22 and its ball 21 are arranged to register with a central hole 24 in the bottom wall 11 of the casing.

A compressible measuring element 25, preferably in the form of a strong coil spring of known capacity, is disposed lengthwise in the member 14 between the top face 26 of the plunger and the bottom face of the threaded shank 16 of the operating member 15.

In the inoperative position of the parts shown in Fig. 2, the member or sleeve 14 extends partly out of the upper end of the casing, being yieldingly supported by the measuring element 25, which by reason of the slidable manner in which the sleeve 14 is arranged, relatively to the casing 9 and plunger 20, exerts only a slight downward pressure on said plunger.

The plunger 20 is yieldingly supported by suitable means, in a manner to hold the test member in predetermined relation to the casing, preferably with its outer end flush with the sample-engaging face 11. This is preferably accomplished by arranging a relatively light coil spring or other resilient member 27 between the inner face of the bottom wall 10 of the casing and a shoulder 28 on the lower end of the plunger.

The plunger 20 is held in its upper, initial position by the spring 27 against suitable stop means, such as a laterally extending stud 30 preferably detachably secured to the plunger by a screw threaded connection, as shown, and extending outwardly through a vertical slot 31 in the wall of the member 14 and through a corresponding slot 32 in the wall of the casing, and against the upper end of which the stud yieldingly bears.

In this latter position the expansive effort of the spring 27 is sufficient to overcome the slight downward pressure exerted on the plunger 20 by the measuring element 25, and as the sleeve 14 is freely movable it readily takes the thrust of the element 25 in an upward direction.

The upper movement of the sleeve 14 is in turn limited by the engagement of the lower end of the slot 31 of said sleeve against the underside of said stud 30. Therefore, by making the slots 31 and 32 of proper length, the test ball or member can be positioned approximately by engagement of the stud 30 with the upper end of the slot 32, and more precisely by a suitable shim or washer 36 of proper thickness disposed between the ball holder 22 and the plunger 20 to which the holder is secured.

The measuring element is of known capacity, so that if compressed a definite distance, the resistance of the spring 27 will be overcome and the plunger 20 moved downwardly and its attached test ball 21 will be forced into the surface of the sample more or less in accordance with the hardness thereof.

However, in accordance with the differences in the hardness of the material to be tested, the plunger 20 will move relatively to the sleeve 14 and to the casing 9 to a greater or less extent. The differential movement of the plunger relatively to the casing will be the depth of penetration of the test ball into the material.

In order to compress the measuring element 25 a predetermined or definite amount, means are provided for positively limiting the downward stroke of the slidable member 14 for each test. For this purpose the lower end of the member 14 is adapted to abut against a fixed part of the casing in its downward movement, such as the bottom wall 11. In this manner tests can be rapidly made, as no particular attention is required to stop the downward movement of the operating member at a given point, as long as pressure is exerted thereon sufficient to force said member down against the bottom wall 11.

The depth of penetration of the test member into the sample can be indicated in any suitable manner. For instance, as shown in Figs. 1–3, there is provided at the side of the casing 10, a dial gage 40 having graduations 41 and a hand or pointer 42. The gage is suitably connected to the plunger 20 so as to move therewith as by attaching the casing of the dial to the end of the stud 30. The dial 40 is preferably of the rack and pinion type, in which the hand 42 is turned in accordance with the rotation of the pinion. The free end of the rack engages with the usual spring pressed post 43, which is disposed so as to rest on a fixed stop 44 on the casing 9 and thus enable the difference in movement between the test ball and the casing to be indicated. Preferably, a friction hand 45 is provided in addition to the hand 42, and which when the indicator is operated, remains at the maximum movement of the indicator, while the hand 42 returns to zero. Thus the depth of the impression can be directly read.

The hardness testing device or tool shown in Figs. 5–8, while embodying the principles above described, is of different construction. This modified device includes a cylindrical casing 50, a plunger 51 movable therein, and at the lower end of which is fixed a test ball 52, as before. The plunger is held in normal, upward position by means of light coil spring 53 disposed between a shoulder 54 on the plunger, and the top face of the bottom wall 56 of the casing. The bottom wall is formed with a central aperture 57 through which the test ball 52 and its holder 58 can be projected. In this construction the upward movement of the plunger is limited by a laterally projecting, screw-threaded stud or part 59 secured to the plunger and which projects therefrom into a vertical slot 60 in the casing and engages the upper end of said slot.

The measuring element comprises, as before, a stiff coil spring 62 of known capacity disposed between the top face of the plunger 51 and the bottom face of an apertured disk 63 slidably arranged to move lengthwise in the upper part of the casing for compressing the measuring element 62. For this purpose the disk 63 is connected to an annular operating member or sleeve 65 surrounding the casing and movable lengthwise thereof, and which is rigidly connected to the disk 63 by inwardly extending, radial screw studs 66 or other suitable means which extend through vertical slots 67 at opposite sides of the casing.

The upward movement of the operating sleeve 65 and its attached disk 63, by reason of the pressure of the measuring element 62, is positively limited by the engagement of the studs 66 with the upper ends of the slots 67, and the downward stroke or movement of these parts is likewise limited, and the necessary predetermined amount of compression of the measuring element 62 determined, by the engagement of the studs 66 with the lower ends of the slots 67, which are formed of correct length for this purpose.

In this modified construction, as in the first construction, the operating member is permitted a definite, downward movement for compressing the measuring element, while the plunger 51 is permitted a variable movement relatively thereto and also to the casing, in accordance with the depth of the indentation, by the provision of the elongated slot 60 in which the stud 59 can move freely downwardly.

As the operating member in this construction extends about and moves lengthwise of the casing and must be grasped by the hand of the operator, it would be inconvenient to locate the indicating dial or means at the side of the casing. The indicating means, therefore is disposed at the top of the device and preferably is also in the form of a dial gage having a cylindrical casing 70 resting on the open, upper end of the casing 60, and a reduced part fitting within an annular shouldered, screw-threaded collar or part 71 screwed into said upper, open end of the casing, which is threaded for this purpose. The dial of this indicator is disposed horizontally so as to be readily read from above, and the pointer thereof is actuated by the movement of a downwardly extending spring-pressed rod or part 75 which follows the movement of the plunger 51. For this purpose, the stem 75 extends through the collar 71 and the aperture in the disk 63 and yieldingly bears upon the upper end of an upwardly extending post or part 76 fixed to the plunger 51. Any other suitable means may be used for imparting movements of the plunger 51 to the indicator 70 for showing the depth to which the test ball 52 penetrates the sample.

The hardness testing devices described are formed of few relatively simple, inexpensive parts, so constructed as to be readily assembled or taken apart, and whereby the measuring element can be easily and quickly removed and replaced by another of like or different capacity. For example, in the first construction the measuring element 25 can be removed by merely unscrewing the knob 15 from the sleeve 14, and by detaching the indicator 41 and stud 30 from the plunger, the operating member, plunger and test member, and plunger supporting spring can all be removed from the casing 9. Likewise, in the second construction, by first detaching the indicator 70 and collar 71 and unscrewing the studs 66, the sleeve 65 and disk 63 and the measuring element 62 are removed, while the plunger 51 and spring 53 can be taken out of the casing after removing the screw stud 59.

The particular advantage obtained by the use of a hardness testing device, as described, is that the tests can be quickly made by merely depressing the operating member until it is arrested by the stop provided. Thus no particular attention is needed as in some previous constructions, to observe when the operating member has reached a desired position. Moreover, the tests can be made on samples of different kinds of material by like movements of the operating member.

I claim as my invention,

1. In a hardness testing device, the combination of a casing, a plunger slidably arranged therein and having a test member adapted to be pressed against a sample, an operating member extending into said casing and slidable relatively thereto and to said plunger, a yielding measuring element of known capacity in said casing and disposed between said operating member and said plunger and which is compressible by movement of said operating member in one direction to move said plunger and press said test member into said sample, and positive stop means for arresting the travel of said operating member when the same has been moved a predetermined distance so as to apply a definite compression to said measuring element.

2. In a hardness testing device, the combination of a casing, a plunger slidably arranged therein and having a test member adapted to be pressed against a sample, an operating member extending into said casing and slidable relatively thereto and to said plunger, a yielding measuring element of known capacity in said casing and disposed between said operating member and said plunger and which is compressible by movement of said operating member in one direction to move said plunger and press said test member into said sample, and a rigid part on said operating member adapted to engage a fixed stop on said casing for arresting the travel of said operating member when the same has been moved a predetermined distance, whereby a definite compression is applied to said measuring element.

3. In a hardness testing device, the combination of a casing, a plunger slidably arranged therein and having a test member adapted to be pressed against a sample, an operating member extending into said casing and slidable relatively thereto and to said plunger, a yielding measuring element of known capacity in said casing and disposed between said operating member and said plunger and which is compressible by movement of said operating member in one direction to move said plunger and press said test member into said sample, positive stop means for arresting the travel of said operating member when the same has been moved a predetermined distance so as to apply a definite compression to said measuring element, resilient means for normally engaging said plunger and urging the same in a direction away from said sample, and stop means against which said plunger is held by said resilient means for holding said test member in a predetermined initial position.

4. In a hardness testing device, the combination of a casing, a plunger therein having a test member adapted to be pressed against a sample, resilient means for yieldingly holding said plunger in an initial position with said test member in predetermined relation to the surface of the sample, an operating member having a part disposed in said casing, a compressible measuring element also disposed in said casing between and engaging said plunger and said operating member part and which normally yieldingly urges said operating member in one direction and holds the same in an inoperative position, and means for permitting a direct, predetermined movement of said member in the opposite direction to compress said measuring element a definite amount and move said plunger against the action of said yielding holding means to force said test member against the sample.

5. In a hardness testing device, the combination of a casing, a plunger therein having a test member adapted to be pressed against a sample, an operating member having a part disposed in said casing, a stop on said casing, a compressible measuring element disposed in said casing between and engaging said plunger and said operating member part and which normally urges said operating member in a direction to yieldingly hold said member in an inoperative position against said stop, and means for permitting a direct, predetermined movement of said member in an opposite direction to compress said measuring element a definite amount and move said plunger to force said test member against the sample.

6. In a hardness testing device, the combination of a casing, a plunger therein having a test member adapted to be pressed against a sample, a stop on said casing, resilient means for normally urging said plunger in a direction away from said sample and against said stop to hold said plunger in an initial position with said test member in predetermined relation to the surface of the sample, an operating member having a part disposed in said casing, a compressible measuring element also disposed in said casing between and engaging said plunger and said operating member part, and means for permitting a predetermined movement of said operating member relatively to said casing to compress said measuring element a definite amount and move said plunger to force said test member against the sample.

7. In a hardness testing device, the combination of a casing, a plunger therein having a test member adapted to be pressed against a sample, a stop on said casing, resilient means for normally urging said plunger in a direction away from said sample and against said stop to hold said plunger in an initial position with said test member in predetermined relation to the surface of the sample, an operating member having a part disposed in said casing, a compressible measuring element also disposed in said casing between and engaging said plunger and said operating member part, a second stop on said casing, said measuring element being arranged to yieldingly urge said operating member in one direction and hold the same against said second stop, and means for permitting a predetermined travel of said operating member in an opposite direction to compress said measuring element a definite amount and move said plunger to force said test member against said sample.

8. In a hardness testing device, the combination of a hollow casing having a transverse end wall formed with a face for engaging the surface of a sample, a plunger in said casing having a test member adapted to be extended through an aperture in said end wall and be pressed against said sample, a stop on said casing, a resilient member in said casing extending between a part of said plunger and a part of said casing and adapted to hold said plunger in an initial position against said stop and with said test member in predetermined relation to said sample-engaging face, a compressible measuring element of known capacity disposed in said casing in engagement with said plunger, an operating member movable relative to said casing, and stop means for permitting a predetermined movement of said operating member for compressing said measuring element a definite amount to move said plunger and force said test member against the sample.

DONALD C. DAVIS.